(12) United States Patent
Bosworth et al.

(10) Patent No.: US 8,774,452 B2
(45) Date of Patent: *Jul. 8, 2014

(54) PREFERRED IMAGES FROM CAPTURED VIDEO SEQUENCE

(71) Applicant: Facebook, Inc., Menlo Park, CA (US)

(72) Inventors: Andrew Garrod Bosworth, San Mateo, CA (US); David Harry Garcia, Sunnyvale, CA (US); Soleio Cuervo, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,097

(22) Filed: Mar. 11, 2013

(65) Prior Publication Data

US 2013/0188879 A1 Jul. 25, 2013

Related U.S. Application Data

(63) Continuation of application No. 13/276,415, filed on Oct. 19, 2011, now Pat. No. 8,437,500.

(51) Int. Cl.
*G06K 9/00* (2006.01)
(52) U.S. Cl.
USPC .............................. 382/100; 382/103; 715/733
(58) Field of Classification Search
None
See application file for complete search history.

(56) References Cited

U.S. PATENT DOCUMENTS

| | | | |
|---|---|---|---|
| 6,647,535 B1 | 11/2003 | Bozdagi et al. | |
| 6,678,413 B1 * | 1/2004 | Liang et al. | 382/181 |
| 7,882,191 B2 * | 2/2011 | Sood | 709/206 |
| 7,945,862 B2 * | 5/2011 | Aldrich et al. | 715/751 |
| 8,019,875 B1 * | 9/2011 | Nielsen | 709/227 |
| 8,156,115 B1 * | 4/2012 | Erol et al. | 707/728 |
| 8,166,168 B2 * | 4/2012 | Hayashi et al. | 709/226 |
| 8,180,804 B1 * | 5/2012 | Narayanan et al. | 707/798 |
| 8,185,558 B1 * | 5/2012 | Narayanan et al. | 707/798 |
| 8,224,912 B2 * | 7/2012 | Sood | 709/206 |
| 8,234,218 B2 * | 7/2012 | Robinson et al. | 705/54 |
| 8,284,990 B2 * | 10/2012 | Ma et al. | 382/103 |
| 8,302,013 B2 * | 10/2012 | Garcia et al. | 715/743 |
| 8,302,015 B2 * | 10/2012 | Krishnan et al. | 715/747 |
| 8,341,185 B2 * | 12/2012 | Sathish | 707/791 |
| 2006/0218225 A1 * | 9/2006 | Hee Voon et al. | 709/201 |
| 2007/0006277 A1 * | 1/2007 | Mills et al. | 725/153 |
| 2009/0100151 A1 * | 4/2009 | Fisher et al. | 709/219 |
| 2009/0254643 A1 * | 10/2009 | Terheggen et al. | 709/223 |
| 2009/0292549 A1 * | 11/2009 | Ma et al. | 705/1 |
| 2009/0307592 A1 * | 12/2009 | Kalanithi et al. | 715/716 |
| 2010/0217645 A1 * | 8/2010 | Jin et al. | 705/9 |
| 2011/0069229 A1 | 3/2011 | Lord | |
| 2011/0164827 A1 * | 7/2011 | Reams et al. | 382/261 |
| 2011/0175923 A1 * | 7/2011 | Mahajan et al. | 345/522 |
| 2011/0246560 A1 * | 10/2011 | Gibson | 709/203 |
| 2012/0096357 A1 * | 4/2012 | Folgner et al. | 715/726 |
| 2012/0189204 A1 * | 7/2012 | Johnson et al. | 382/181 |

* cited by examiner

*Primary Examiner* — Manav Seth
(74) *Attorney, Agent, or Firm* — Baker Botts L.L.P.

(57) ABSTRACT

In one embodiment, a computer system identifies a user in one or more frames of a video file, accesses a data store for image attitudinal data associated with the user, ranks the one or more frames based on the image attitudinal data associated with the user, and presents one or more top ranked frames to the user.

15 Claims, 5 Drawing Sheets

PREFERRED IMAGES FROM CAPTURED VIDEO SEQUENCE

PRIORITY

This application is a continuation under 35 U.S.C. §120 of U.S. patent application Ser. No. 13/276,415, filed 19 Oct. 2011, which is incorporated herein by reference.

TECHNICAL FIELD

The present disclosure generally relates to methods of selecting one or more video frames from a video file based on attitudinal data associated with comparable images.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to methods of identifying a user in one or more frames of a video file, accessing a data store for image attitudinal data associated with the user, ranking the one or more frames based on the image attitudinal data, and presenting one or more top ranked frames to the user. These and other features, aspects, and advantages of the disclosure are described in more detail below in the detailed description and in conjunction with the following figures.

DETAILED DESCRIPTION

Figure 1:
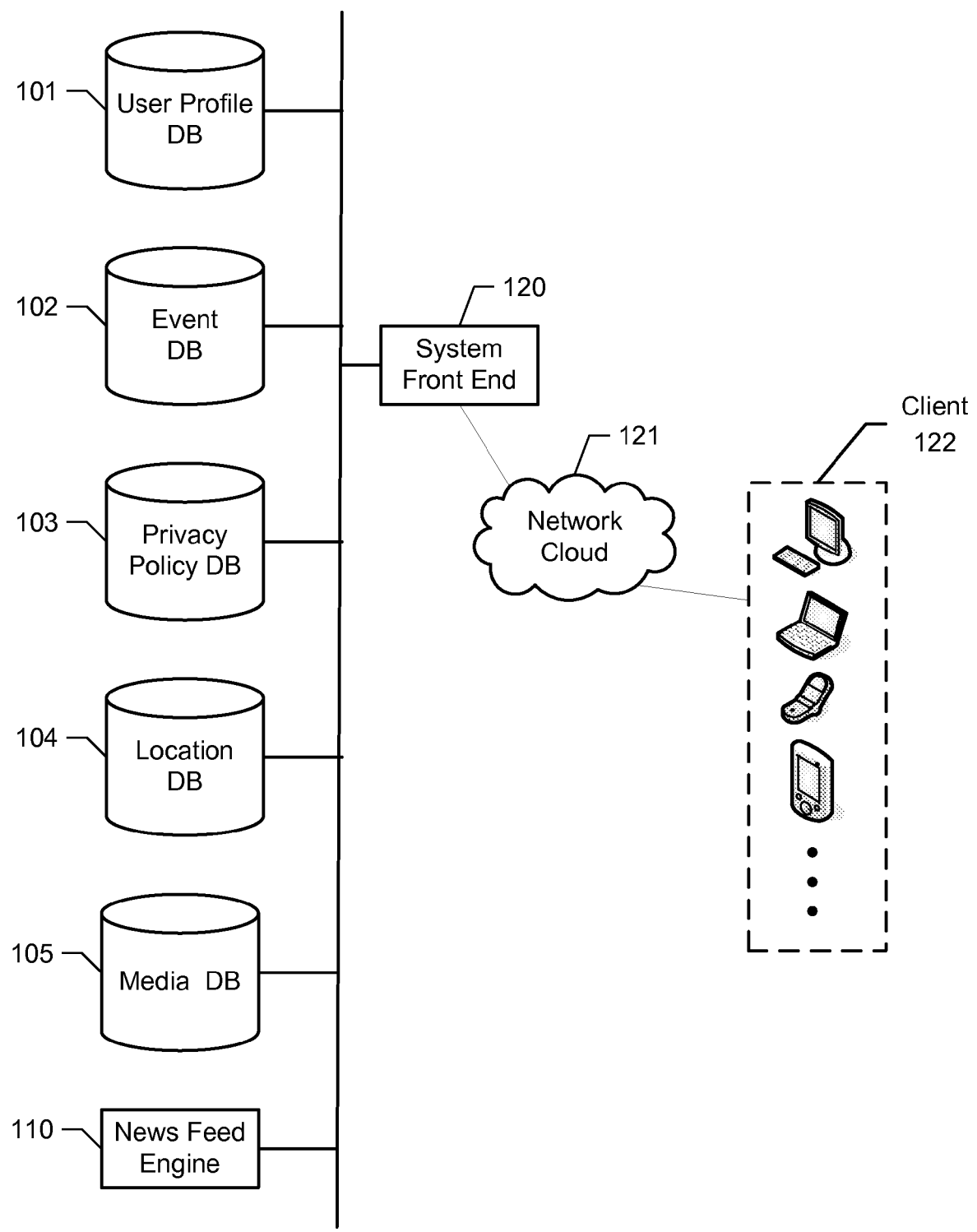
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in location database 104. As described in U.S. patent application Ser. No. 12/763,171, information about a created place may be stored in a hub node in a social graph, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, news feed engine 110 may access user profile database 101, event database 102, and location database 104 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, and location database 104 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

In particular embodiments, a user of the social networking system may upload one or more media files to media database 105. For example, a user can upload a photo or a set of photos (often called a photo album), or a video clip (or an audio clip) to media database 105 from a client device 122 (e.g., a computer, or a camera phone). The user may further select one or more privacy settings for each of the uploaded media files (e.g., accessible to only first-degree connections, accessible to only first- and second-degree connections, accessible to all users of the social networking system). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. In one implementation, the client device 122 may implement the Exchangeable image file format (Exif), or a modified version thereof. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. U.S. Pat. No. 7,945,653, herein incorporated by reference in its entirety and for all purposes, describes methods of enabling a first user of a social networking system to select a region of a photo and associate the selected region to a second user, and in response to a confirmation from the second user, storing the association in a database. As described in U.S. patent application Ser. No. 12/763,171, the photo and related information (e.g., one or more privacy settings) may be stored in a particular node of a social graph, while the association between the photo and the second user may be stored in an edge connecting the particular node and a user node for the second user. For example, in response to a user's request, the social networking system may, based on the one or more privacy settings, display the photo with a tag corresponding to the second user, while the tag comprises a link to a webpage (e.g., a user profile page) associated with the second user. In particular embodiments, the social networking system may also extract metadata from a media file and store the metadata in media database 105.

In addition to tagging an image, a user may also like, and/or comment on, an image. For example, a user can access a photo as part of a structured document displayed in a graphical user interface of an application hosted by the user's client device, and select a "like" button adjacent to the photo, causing the application to transmit a request to the social networking system to store the like association in an edge between a concept node corresponding to the photo and a user node corresponding to the user in a social graph. The social networking system can store the "like" association in media database 105. Meanwhile, a user may remove a tag or like association with an image. For example, a user can access a photo as part of a structured document displayed in a graphical user interface of an application hosted by the user's client device, and select an "unlike" or "un-tag" button adjacent to the photo, causing the application to transmit a request to the social networking system to remove a tag association between the user and the photo (wherein the tagging may or may not have been done by the user) or to remove a like association between the user and the photo. Meanwhile, the social networking system can store an un-tag or an un-like association in an edge between a concept node corresponding to the photo and a user node corresponding to the user in the social graph. In particular embodiments, the social networking system may determine image attitudinal data between an image (e.g., a photo, a video clip) and a user based on the tag, like, un-tag, and/or the unlike association described above between the image and the user. For example, a photo of a first user (or a photo that the first user is tagged to) is likely to be favored by the first user if one or more users (which may or may not include the first user) like the photo or add positive comments about the photo. For example, a photo of a first user (or a photo that the first user is tagged in) is unlikely favored by the first user if the first user unlikes or un-tags the photo. In particular embodiments, the social networking system may assign an attitudinal score between an image and a user based on the tag, like, un-tag, and/or the unlike association described above between the image and the user. For example, the social networking system can assign an attitudinal score of 3 to a photo of first user (or a photo file that the first user is tagged to) if three users like the photo. For example, the social networking system can assign an attitudinal score of 5 to a photo of a first user (or a photo that the first user is tagged to) if five users like the photo. For example, the social networking system can assign an attitudinal score of −1 to a photo of a first user (or a photo that the first user is tagged to) if the first user removes a tag or a like association between the photo and the first user. In addition to the tag, like, un-tag, and the unlike association, a user may also indicate a favorable or unfavorable preference of an image in other manners. For example, a profile picture of a first user is likely favored by the first user. For example, a photo of a first user (or a photo that the first user is tagged to) is likely to be favored by the first user if there are one or more comments and captions of the photo indicating a positive attitude (e.g., "Great Shot!", "beautiful", "good", "happy family", etc.) by those that have viewed it. Accordingly, attitudinal data can be the number and types of comments associated with an image or other content. The social networking system may analyze comments and captions of an image (e.g., by using a natural language processing algorithm) for indication of positive attitude. In particular embodiments, the social networking system may assign a positive attitudinal score (e.g., +1) to a user's profile picture. The social networking system may also assign a positive attitudinal score to an image based on comments/captions indicating positive attitude. For example, the social networking system can assign an attitudinal score of +6 to a photo of a first user (or a photo that the first user is tagged to) if four users like the photo, and there are two comments indicating positive attitude (e.g., "You look great!", "It's beautiful!"). As described in U.S. patent application Ser. No. 12/763,171, the social networking system may store image attitudinal data (e.g., an attitudinal score) in an edge between a user node corresponding to a user and a concept node corresponding to an image in a social graph. Furthermore, the social networking system may store the image attitudinal data in media database 105.

Similarly, the social networking system may store image attitudinal data in an edge between a concept node corresponding to an image and another concept node corresponding to a social network object in a social graph. For example, a social network object corresponding to a concept node in a social graph can be a place, a business, a brand, a product, an organization, a public figure, etc. An owner or an administrative user of a social network object corresponding to a concept node in a social graph may add or remove a tag or a like association with an image using tagging, un-tagging, "like", or "unlike" as described earlier. The social networking system may store image attitudinal data (e.g., an attitudinal score based on numbers of tag, like, un-tag, and/or un-like association described earlier) in an edge between a concept node corresponding to the social network object and a concept node corresponding to the image. The social networking system may store the image attitudinal data in media database 105.

Particular embodiments herein describe methods of selecting one or more video frames from a video file based on image attitudinal data associated with a social network object. For example, particular embodiments described herein can identify a user in a video file, access media database 105 for photos with attitudinal data associated with the user, and select from the video file one or more frames likely favored by the user by selecting one or more frames that are similar to photos with favorable attitudinal data associated with the user.

Figure 2:
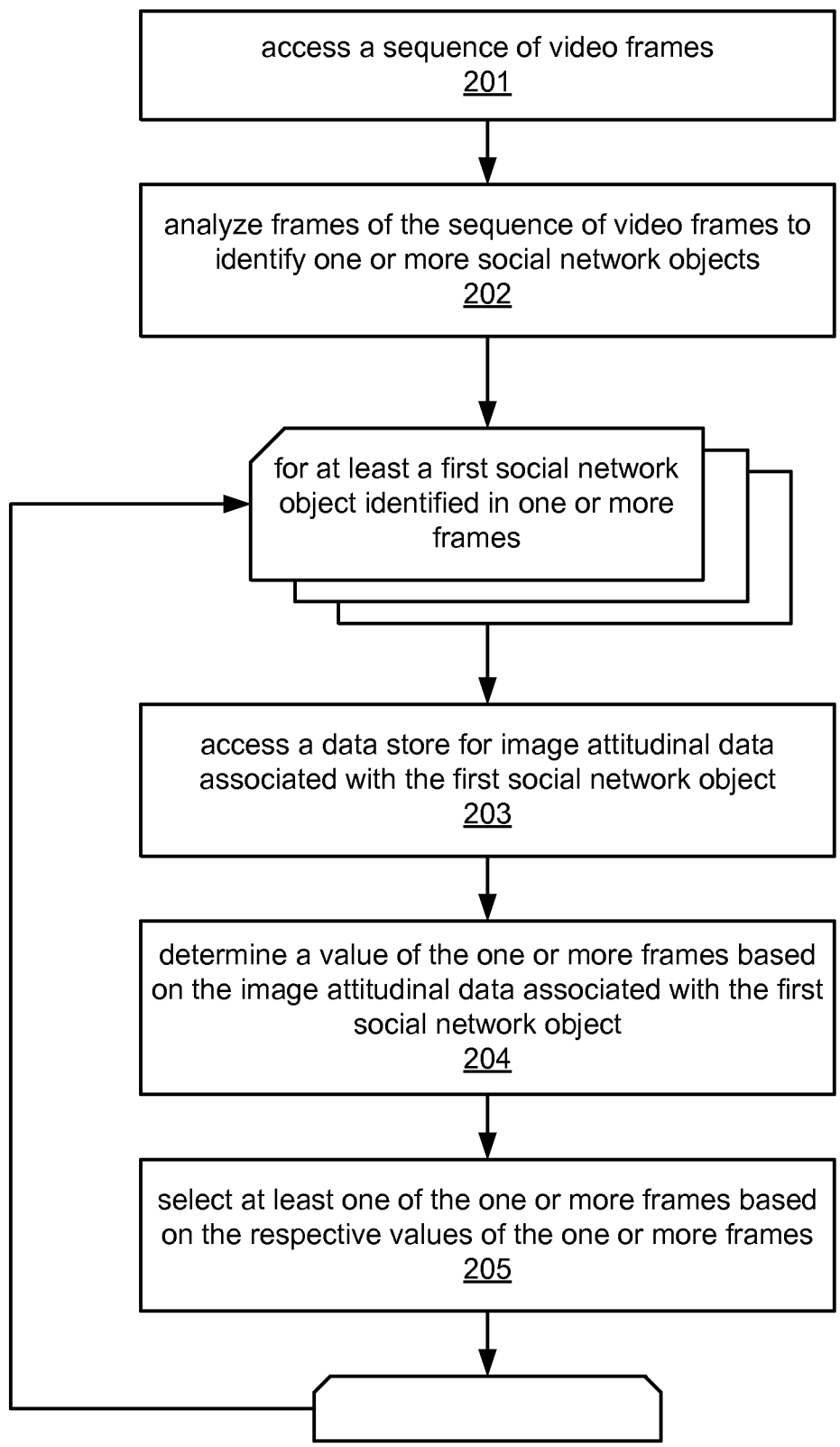
FIG. 2 illustrates an example method of selecting images from a video sequence base on image attitudinal data.

FIG. 2 illustrates an example method of selecting images from a video sequence based on image attitudinal data. The example of FIG. 2 can be implemented by a preferred image selection process hosted by one or more computing devices of the social networking system. In particular embodiments, the preferred image selection process may access video data comprising a sequence of video frames (201). In particular embodiments, the preferred image selection process may analyze frames of the sequence of video frames to identify one or more social network objects (202). The one or more social network objects may comprise one or more user nodes in a social graph and corresponding respective users, one or more concept nodes in a social graph and corresponding respective concepts, or any combination of those. For example, the preferred image selection process can access media database 105 for a video file uploaded by a user, and analyze frames of the video file to identify one or more social network objects (which may or may not include the uploading user).

In particular embodiments, the preferred image selection process may analyze frames of the sequence of video frames to identify one or more users of the social networking system. In particular embodiments, the preferred image selection process may isolate one or more faces in one or more frames of the sequence of frames, and identify one or more users corresponding to the one or more isolated face. U.S. patent application Ser. No. 12/890,283, which describes methods of identifying one or more users corresponding to one or more faces in an image (e.g., a photo, a video clip) based on spatio-temporal proximity, is herein incorporated by reference for all purposes. In particular embodiments, the preferred image selection process may determine a location and time stamp of the video file, and determine a list of users who are at or near the location within a pre-determined time window (e.g., +/−10 minutes) of the time stamp. For example, the preferred image selection process may access a video file's metadata for location (e.g., eXIF data, GPS coordinates, a name of a location) and time stamp of the video file. For example, the preferred image selection process can access event database 102 and/or location database 104 for a list of users who are at or near the location of the video file within a pre-determined time window of the video file's time stamp. The preferred image selection process may identify one or more users corresponding to the isolated faces by matching (e.g., by using a facial recognition algorithm) facial images of the list of users to the one or more isolated faces. For example, the preferred image selection process can access user profile database 101 for user profile pictures of one or more users of the list of users, and match the user profile pictures to the one or more isolated faces.

In some embodiments, the preferred image selection process may analyze frames of the sequence of video frames to identify one or more users of the social networking system based on audio recorded in the sequence of video frames. In particular embodiments, the preferred image selection process may isolate one or more audio segments in the sequence of video frames. In particular embodiments, the preferred image selection process may determine (e.g., by accessing location database 104) a list of users who are at or near the location of the video file and within a pre-determined time window (e.g., +/−10 minutes) of the time stamp of the video file, and identify one or more users corresponding to the one or more audio segments by matching (e.g., by using an audio recognition algorithm) audio data (e.g., a voicemail left by a user, a video clip tagged to a user) of the list of users to the one or more audio segments. For example, an audio recognition algorithm may transform a waveform of an audio file in time domain to frequency domain by a suitable mathematical transformation (e.g., Fast Fourier Transform, Discrete Cosine Transform, wavelet transform), and extract a "fingerprint" of the audio file in frequency domain. The audio recognition algorithm may determine a match between two audio files by comparing fingerprints of the two audio files. For example, the audio recognition algorithm can determine a match between an unknown audio file (e.g., an audio segment of the sequence of video frames) and an audio file associated with a known identity (e.g., a video clip tagged to a user) by comparing a fingerprint of the unknown audio file and a fingerprint of the audio file associated with a known identity.

In other embodiments, the preferred image selection process may analyze frames of the sequence of video frames to identify one or more social networking objects corresponding to concept nodes in a social graph. For example, a social networking object can be a place (e.g., Eiffel Tower, Golden Gate Bridge, Yosemite National Park, Hollywood), a business or an organization (e.g., a coffee shop, San Francisco Giants), or a brand or product (e.g., Coca-Cola, Louis Vuitton). The preferred image selection process may determine (e.g., by accessing location database 104) a list of social network objects that are at or near the location and within a pre-determined time window of the time stamp of the video file, and identify one or more social network objects corresponding to one or more frames of the sequence of video frames by matching (e.g., by using an object recognition algorithm) images of the list of social networking objects (e.g., profile photos associated with each of the list of social network objects) to content of one or more frames. For example, an object recognition algorithm may use optical character recognition techniques to identify one or more characters (e.g., "HOLLYWOOD", "San Francisco Giants") in one or more frames and match against image data (or identity data such as names, logos) of the list of social network objects nearby. For example, an object recognition algorithm may use computer vision techniques to extract a set of features (e.g., edges, corners, ridges, blobs, curvatures, etc.) from an image. The object recognition algorithm may determine a match between two images by comparing respective sets of features of the two images. For example, an object recognition algorithm can determine a match between an unknown image (e.g., one of the frames) and an image of a known identity (e.g., an image of Eiffel Tower) by comparing a first set of features of the unknown image and a second set of features of the image of a known identity.

In particular embodiments, for at least a first social network object identified in one or more frames of the video file, the preferred image selection process may access a data store for image attitudinal data associated with the first social network object (203). In particular embodiments, the preferred image selection process may access a data store for one or more images with attitudinal data associated with the first social network object. In particular embodiments, the preferred image selection process may access media database 105 for images with attitudinal scores associated with the first social network object. For example, the preferred image selection process can access media database 105 for images with positive attitudinal data associated with a user—e.g., images with positive attitudinal scores associated with the user based on the tag and like associations, and the comments/captions indicating positive attitude as described earlier. For example, the preferred image selection process can access media database 105 for images with negative attitudinal data associated with a user—e.g., images with negative attitudinal scores associated with the user based on the un-tag and unlike associations described earlier.

In particular embodiments, the preferred image selection process may determine a value of the one or more frames wherein the first social network object is identified based on the image attitudinal data associated with the first social network object (204). Particular embodiments may score a frame of the one or more frames wherein the first social network object is identified by finding one or more similar images from the one or more images with attitudinal data associated with the first social network object, and score the frames based on the one or more similar images. That is, particular embodiments may identify a representative set of favorable images of the first social network object (e.g., images with positive attitudinal scores associated with the first social network object described earlier), compare the one or more frames (wherein the first social network object is identified) to the representative set of favorable images, and select at least a frame that most closely matches at least one of the representative set of favorable images. In particular embodiments, the preferred image selection process may match (e.g., by using an image processing algorithm) the one or more frames wherein the first social network object is identified to the one or more images with attitudinal data associated with the first social network object. The preferred image selection process may determine a match between a frame wherein the first social network object is identified and an image with attitudinal data associated with the first social network object by comparing similarity between the frame and the image. For example, for a first social network object corresponding to a user node in a social graph, the preferred image selection process can compare similarity in facial expression, facial background, clothing, background, or any combination of above. For example, for a first user social network object corresponding to a concept node in a social graph (e.g., Golden Gate Bridge), the preferred image selection process can compare similarity in lighting, angle, color, background, or any combination of above. An image processing or matching algorithm may return a correlation coefficient between the frame and the image. For example, the correlation coefficient can range from 0.0 ("no correlation at all") to 1.0 ("perfect match"). The preferred image selection process may determine a match if a correlation coefficient is above a predetermined threshold (e.g., 0.8).

In particular embodiments, the preferred image selection process may assign a preference score to a frame wherein the first social network object is identified by a cumulative attitudinal score of one or more matched images with attitudinal scores associated with the first social network object. For example, the preferred image selection process can assign a preference score of −1 to a frame if there is one matched image with an attitudinal score of −1. For example, the preferred image selection process can assign a preference score of +3 if there is one matched image with an attitudinal score of +3. For example, the preferred image selection process can assign a preference score of +7 to a frame if there are a matched image with an attitudinal score of +2 and another matched image with an attitudinal score of +5. That is, a frame matches more closely to a representative set of favorable images of the first social network objects (e.g., matching more images with positive attitudinal scores associated with the first social network object, and/or matching an image with high attitudinal score associated with the first social network object) can have a higher cumulative attitudinal score and thus a higher preference score. In particular embodiments, the preferred image selection process may assign a default preference score of 0, if there is no matched images with attitudinal scores associated with the first social network object.

In particular embodiments, the preferred image selection process may select at least one of the one or more frames based on the respective values of the one or more frames (205). For example, the preferred image selection process can rank the one or more frames wherein the first social network object is identified based on respective preference scores of the one or more frames. For example, the preferred image selection process can select one or more top ranked frames—i.e., frames that most closely match a representative set of the first social object's favorable images. In particular embodiments, the preferred image selection process may store the selected at least one of the one or more frames in a data store (e.g., in media database 105). In particular embodiments, the preferred image selection process may tag the first social network object to the video file. For example, the preferred image selection process may store the tagging association in media database 105.

Figure 3:
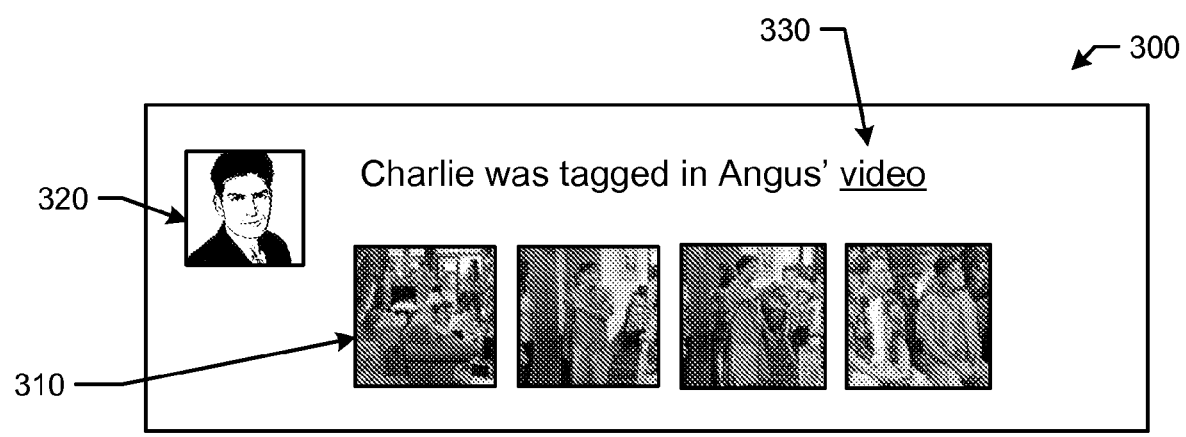
FIG. 3 illustrates an example news feed.

In particular embodiments, the preferred image selection process may present the selected frames to one or more users associated with, or corresponding to, the first social network object. For example, the preferred image selection process can cause news feed engine 110 to construct a news feed entry comprising thumbnails corresponding to the selected frames (based on one or more privacy settings associated with the selected frames), and add the news feed entry to a news feed for the first social network's profile page. FIG. 3 illustrates an example news feed entry with thumbnails corresponding to frames selected by the example method of FIG. 2. For example, news feed entry 300 may comprise thumbnails 310 corresponding to frames selected for a first user (e.g., "Charlie") from a video file of a second user (e.g., "Angus") by the example method of FIG. 2. News feed entry 300 may further comprise a profile picture of the first user (320). News feed entry may also comprise a selectable link 330 for the video file. In one embodiment, each thumbnail in news feed entry 300 may comprise a link to a video segment of the video file, wherein the video segment has a configurable time window overlapping the frame corresponding to the thumbnail. For example, when a user selects the thumbnail, an application displaying the news feed entry may retrieve the video segment based on the link, and play the video segment (e.g., in a frame hovering over the news feed entry) that starts at 10 seconds before the corresponding frame and ends at 10 seconds after the corresponding frame. As yet for another example, the preferred image selection process or other processes of the social networking system may construct a structured document (e.g., a web page) comprising one or more photos (or thumbnails) corresponding to one or more frames selected from a video, wherein the one or more photos (or thumbnails) may further comprises links to perspective corresponding video segments of the video. When a user selects a thumbnail (or move a curser over a photo) displayed in the structured document, an application displaying the structured document may retrieve and play a video segment overlapping the corresponding frame. The content of the news feed entry and the structured document described above may be specific to a particular user, as thumbnails or photos in the news feed entry and the structured document are selected, by the example method of FIG. 2, based on image attitudinal data associated with the particular user.

Figure 4:
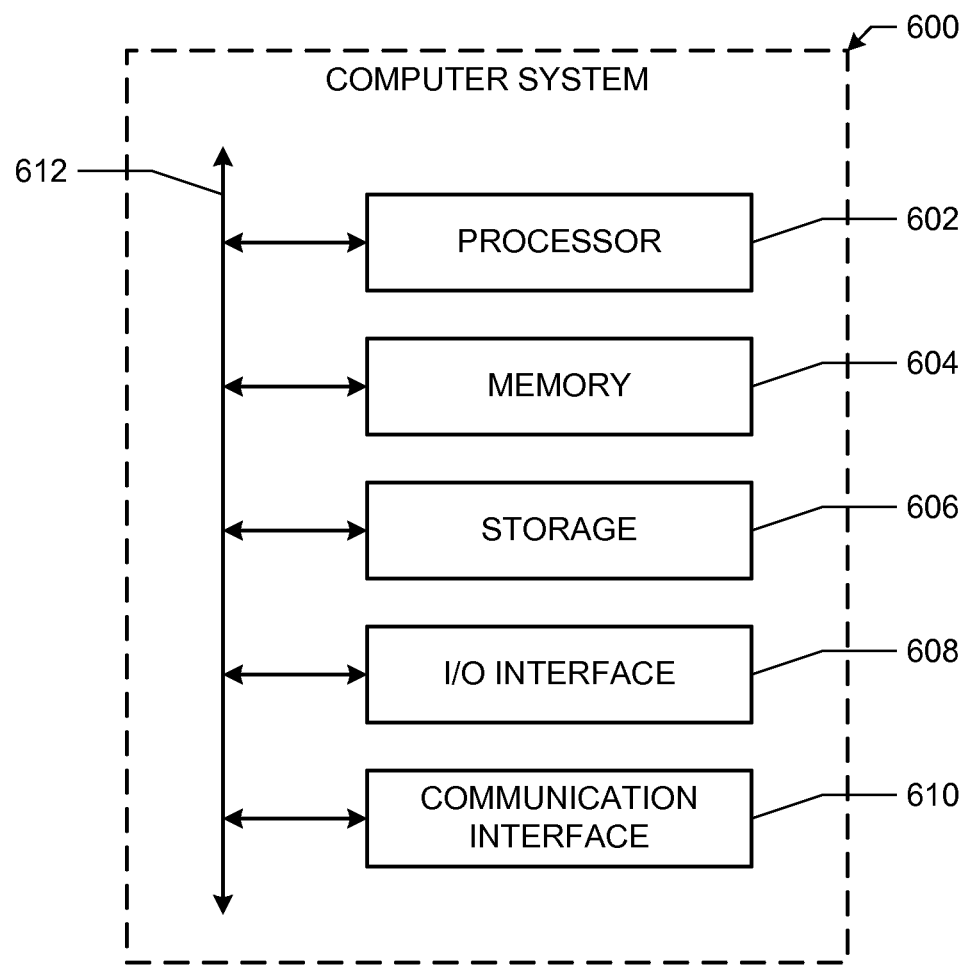
FIG. 4 illustrates an example computer system.

FIG. 4 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network,), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Degital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 5:
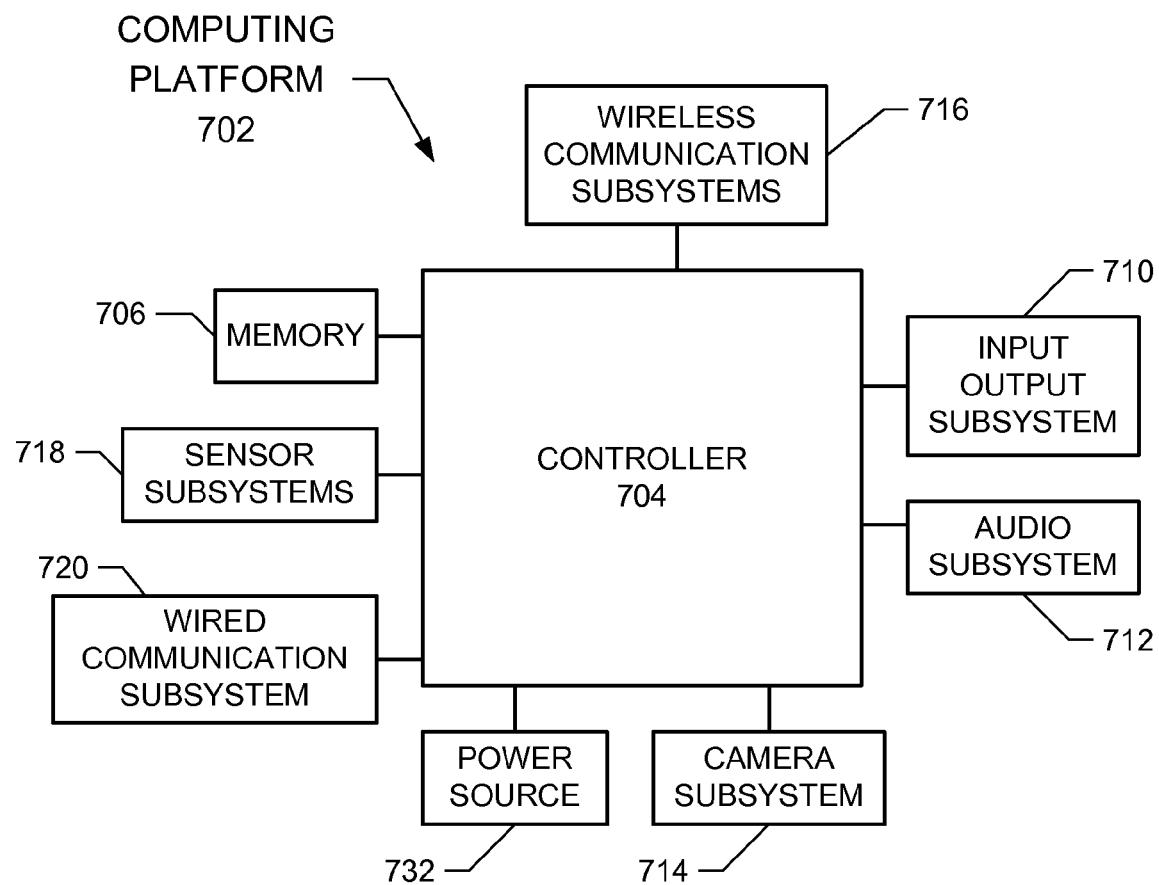
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, by one or more computing devices, comprising:
   accessing image data comprising a plurality of images;
   analyzing at least some of the images to identify one or more social network objects;
   for at least a first social network object of the one or more identified social network objects, wherein the first social network object is identified in one or more particular images of the images:
      accessing a data store for image attitudinal data associated with the first social network object;
      determining a value of the particular images based on the image attitudinal data associated with the first social network object; and
      selecting at least one of the particular images based on the respective values of the particular images.

2. The method of claim 1, wherein for at least a first social network object of the one or more identified social network objects, wherein the first social network object is identified in one or more particular images of the images, further comprises:
   presenting one or more selected images to the first social network object.

3. The method of claim 2, wherein the presenting one or more selected images to the first social network object, further comprises:
   constructing a structured document comprising one or more of the selected images; and
   presenting the structured document to the first social network object.

4. The method of claim 3, wherein at least one selected image in the structured document further comprising a selectable link to a portion of the images, the portion including the at least one selected image.

5. The method of claim 1, further comprising:
   tagging at least one of the one or more identified social network objects to at least part of the image data.

6. A system comprising:
   one or more processors; and
   a memory coupled to the processors comprising instructions executable by the processors, the processors being operable when executing the instructions to:
      access image data comprising a plurality of images;
      analyze at least some of the images to identify one or more social network objects;
      for at least a first social network object of the one or more identified social network objects, wherein the first social network object is identified in one or more particular images of the images;
         access a data store for image attitudinal data associated with the first social network object;
         determine a value of the particular images based on the image attitudinal data associated with the first social network object; and
         select at least one of the particular images based on the respective values of the particular images.

7. The system of claim 6, wherein for at least a first social network object of the one or more identified social network objects, wherein the first social network object is identified in one or more particular images of the images, the processors are further operable when executing the instructions to:
   present one or more selected images to the first social network object.

8. The system of claim 7, wherein to present one or more selected images to the first social network object, the processors are further operable when executing the instructions to:
   construct a structured document comprising one or more of the selected images; and
   present the structured document to the first social network object.

9. The system of claim 8, wherein at least one selected image in the structured document further comprising a selectable link to a portion of the images, the portion including the at least one selected image.

10. The system of claim 6, wherein the processors are further operable when executing the instructions to:
    tag at least one of the one or more identified social network objects to at least part of the image data.

11. One or more computer-readable non-transitory storage media embodying software that is operable when executed to:
    access image data comprising a plurality of images;
    analyze at least some of the images to identify one or more social network objects;
    for at least a first social network object of the one or more identified social network objects, wherein the first social network object is identified in one or more particular images of the images:
       access a data store for image attitudinal data associated with the first social network object;
       determine a value of the particular images based on the image attitudinal data associated with the first social network object; and
       select at least one of the particular images based on the respective values of the particular images.

12. The media of claim 11, wherein for at least a first social network object of the one or more identified social network objects, wherein the first social network object is identified in one or more particular images of the images, the software is further operable when executed to:
   present one or more selected images to the first social network object.

13. The media of claim 12, wherein to present one or more selected images to the first social network object, the software is further operable when executed to:
   construct a structured document comprising one or more of the selected images; and
   present the structured document to the first social network object.

14. The media of claim 13, wherein at least one selected image in the structured document further comprising a selectable link to a portion of the images, the portion including the at least one selected image.

15. The media of claim 11, wherein the software is further operable when executed to:
   tag at least one of the one or more identified social network objects to at least part of the image data.

\* \* \* \* \*